United States Patent
Stansby

(10) Patent No.: US 9,631,600 B2
(45) Date of Patent: Apr. 25, 2017

(54) WAVE ENERGY CONVERTER

(71) Applicant: M4 WAVEPOWER LTD., Macclesfield Cheshire (GB)

(72) Inventor: Peter Kenneth Stansby, Macclesfield (GB)

(73) Assignee: M4 WAVEPOWER LTD., Macclesfield, Cheshire (GB)

( * ) Notice: Subject to any disclaimer, the term of this patent is extended or adjusted under 35 U.S.C. 154(b) by 23 days.

(21) Appl. No.: 14/406,247

(22) PCT Filed: Mar. 26, 2013

(86) PCT No.: PCT/GB2013/050787
§ 371 (c)(1),
(2) Date: Dec. 8, 2014

(87) PCT Pub. No.: WO2013/182837
PCT Pub. Date: Dec. 12, 2013

(65) Prior Publication Data
US 2015/0152836 A1    Jun. 4, 2015

(30) Foreign Application Priority Data
Jun. 8, 2012 (GB) .................................. 1210133.3

(51) Int. Cl.
*F03B 13/20* (2006.01)
*F03B 13/16* (2006.01)

(52) U.S. Cl.
CPC .............. *F03B 13/20* (2013.01); *F03B 13/16* (2013.01); *F05B 2250/42* (2013.01); *Y02E 10/38* (2013.01)

(58) Field of Classification Search
CPC ........... F03B 13/16; F03B 13/20; Y02E 10/38
See application file for complete search history.

(56) References Cited

U.S. PATENT DOCUMENTS

| 4,371,788 A | 2/1983 | Smith, Jr. |
| 4,404,490 A * | 9/1983 | Taylor ..................... F03B 13/14 290/42 |
| 2009/0217657 A1 | 9/2009 | Budd |

(Continued)

FOREIGN PATENT DOCUMENTS

| CN | 1421604 | 6/2003 |
| CN | 101718247 | 6/2010 |

(Continued)

*Primary Examiner* — Audrey K Bradley
(74) *Attorney, Agent, or Firm* — Terry M. Sanks, Esq.; Beusse Wolter Sanks & Maire, PLLC

(57) ABSTRACT

A wave energy converter to float in water, including a first body assembly having a first body and a sub-body rigidly connected to the first body by an assembly arm and a second body wherein the first body assembly and the second body being connected to one another via a first arm, the first arm being pivotally connected to at least one of the first body assembly and second body, the first body assembly and the second body also being connected to one another via a linkage that, via movement of at least a part of that linkage, allows for movement of the first body assembly and second body relative to one another in an anti-phase manner, and separation between the first body and the sub-body provides for tunability to tune the wave energy converter for use in a particular wave field.

17 Claims, 6 Drawing Sheets

(56) References Cited

U.S. PATENT DOCUMENTS

Figure 1:
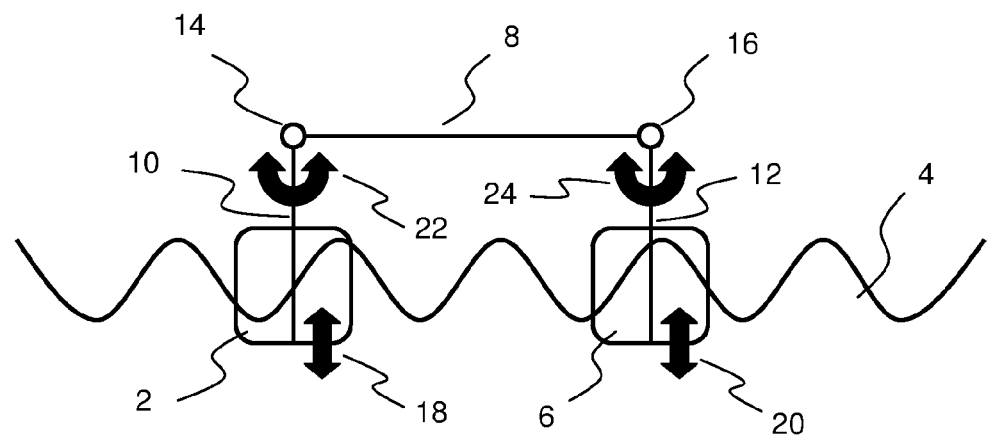

2011/0012358 A1* 1/2011 Brewster ............ F03B 13/1885
 290/53
2011/0042954 A1 2/2011 Werjefelt

FOREIGN PATENT DOCUMENTS

| | | |
|---|---|---|
| DE | 102009016387 | 10/2010 |
| WO | 00/08334 | 2/2000 |
| WO | 2011022057 | 2/2011 |
| WO | 2011071390 | 6/2011 |
| WO | 2011/147949 | 12/2011 |

* cited by examiner

WAVE ENERGY CONVERTER

The present invention relates to a wave energy converter.

In recent years there has been an increasing drive to identify and use renewable energy sources. One such renewable energy source that has been identified and used is wave power. The basic principle of using this renewable energy source lies in the design of a structure that is in some way able to convert wave energy into another form of energy, for example kinetic energy or electrical energy.

There have been many approaches to the design of a structure that is capable of wave energy conversion. Some of such structures are immovable in a wave field in which the structure is used, for example being fixedly located on a sea bed or the like. A disadvantage with this approach is the cost of fixing the structure to the sea bed, particularly in deep water. Another disadvantage is the inability to move the structure easily after initial installation, which may sometimes be required. In an alternative approach, the structure may be movable across the surface of the water, not necessarily being rigidly fixed in position on or relative to a sea bed or the like. However, a problem still exists with this approach. The problem is that, in general, the structures involved are not designed or used with reference to a given or expected wave field, and thus optimal energy conversion is not considered. Instead, the structures are designed somewhat arbitrarily for general, and not optimal, energy conversion from a wave field. Even if the structures are not designed in an arbitrary manner, the structures are not designed to take into account the different motions of the floating bodies that the waves can enforce, and are thus not designed to extract as much energy as could be obtained from the waves.

It is an object of the present invention to provide a wave energy converter and/or a method of using or designing such a wave energy converter, that obviates or mitigates one or more disadvantages of the prior art, whether identified herein or elsewhere, or to provide an alternative to prior art wave energy converters or methods of using such wave energy converters. Another simultaneous or alternative objective is to improve power capture capability.

According to a first aspect of the present invention, there is provided a wave energy converter, configured to float in water, comprising: a first body assembly, comprising a first body, configured to float in water and a sub-body rigidly connected to the first body by an assembly arm, the sub-body being configured to float in water; a second body, configured to float in water; the first body assembly and the second body being connected to one another via a first arm, the first arm being pivotally connected to at least one of the first body assembly and second body; the first body assembly and the second body also being connected to one another via a linkage that, via movement of at least a part of that linkage, allows for movement of the first body assembly and second body toward and away from one another in a surge driven anti-phase manner; one or more properties of the wave energy converter being tuneable, to tune the wave energy converter for use in a particular wave field, or one or more properties of the wave energy converter being tuned for use in a particular, pre-determined wave field, such that, in use, the tuning results in substantially anti-phase motion of the first body assembly and the second body relative to one another for that wave field.

The sub-body may be connected to a fixed location.

The first body and the second body being connected to one another via a first arm, the first arm being pivotally connected to at least one of the first body and second body.

The linkage may be pivotally connected to the first body and the second body.

The first arm may be pivotally connected to the first body and the second body.

The first arm and the linkage may each be connected to different pivotal connections of the wave energy converter (e.g. as opposed to an end of the linkage and an end of the first arm being connected to the same pivotal connection).

The pivotal connection or connections of the first body may be fixed in position relative to the first body; and/or one or more of the pivotal connection or connections of the second body may be fixed in position relative to the second body.

The linkage may comprise a second arm and a third arm, connected to one another by an additional pivotal connection, the additional pivotal connection being moveable relative to the first and/or second body (and, thus, any pivotal connections that have are fixed in position relative to the body or bodies). Only one arm may pivot about the additional pivotal connection. The other arm may not pivot. For example, one arm may be provided with the pivotal connection, about which the other arm pivots.

Translational movement of the additional pivot connection, and/or the second and/or third arm, might be constrained to being in a longitudinal direction, which might assist power extraction. Movement of the additional pivotal connection might be constrained to being along a surface of the first or second body, or a structure mounted thereon. This might be useful if at least a part of a power extraction arrangement is located on the same body.

The property of the converter, configured such that anti-phase surge motion of the first body assembly and second body is realised (in use), may be a horizontal separation between the first body and the second body. The converter may be arranged such that, in use, the horizontal separation between the first body assembly and the second body may be, or may be tuneable to be, substantially between a quarter and three-quarters of a (e.g. prominent or dominant) wavelength in a wave field in which the converter is to be used, or substantially equal to a half-wavelength of a wave in the wave field.

The property of the converter, configured such that anti-phase surge motion of the first body and sub-body is realised (in use), may be a horizontal separation between the first body and the sub-body. The converter may be arranged such that, in use, the horizontal separation between the first body and the sub-body may be, or may be tuneable to be, substantially between a quarter and three-quarters of a (e.g. prominent or dominant) wavelength in a wave field in which the converter is to be used, or substantially equal to a half-wavelength of a wave in the wave field.

One or more properties of the wave energy converter may be tuneable, to tune the wave energy converter for use in a particular wave field, or may be tuned for use in a particular, pre-determined wave field, such that, in use, the tuning results in: surge motion of the first body assembly and the second body toward and away from one another, and/or surge resonance of one or both of the first body assembly and the second body, and/or heave resonance of one or both of the first body assembly and the second body, and/or pitch resonance of one or both of the first body assembly and the second body.

The property for resonance may be (depending on the type of resonance required) one or more, or a combination of: a separation between the first body assembly and the second body; and/or a separation between the first body and the sub-body and/or a draft, in use, of the first body and/or the second body and/or the sub-body; and/or a mass of the first body and/or the second body and/or the sub-body; and/or a dimension of the first body and/or the second body and/or the sub-body; and/or a structural stiffness of at least a part of the converter; and/or and a centre of buoyancy, gravity and/or a position of a metacentre of that body; a centre of buoyancy of the first body and/or the second body and/or the sub-body; and/or a centre of gravity of the first body and/or the second body and/or the sub-body; and/or a position of a metacentre of the first body and/or the second body and/or the sub-body; and/or a second moment of area of the first body and/or the second body and/or the sub-body.

The first body may be smaller in size and/or weight than the second body.

The sub-body is smaller in size and/or weight than the first body and/or the second body.

The first body and/or second body and/or sub-body may have a diameter that is substantially equal to or less than half a wavelength of a wave in the wave field.

According to a second aspect of the invention, there is provided a wave energy converter, configured to float in water, comprising: a first body, configured to float in water; a second body, configured to float in water; the first body and the second body being connected to one another via a first arm, the first arm being pivotally connected to at least one of the first body and second body; the first body and the second body also being connected to one another via a linkage that, via movement of at least a part of that linkage, allows for movement of the first body and second body toward and away from one another in a surge driven anti-phase manner; one or more properties of the wave energy converter being tuneable, to tune the wave energy converter for use in a particular wave field, or one or more properties of the wave energy converter being tuned for use in a particular, pre-determined wave field, such that, in use, the tuning results in substantially anti-phase surge motion of the first body and the second body toward and away from one another for that wave field.

The linkage may be pivotally connected to the first body and the second body.

The first arm may be pivotally connected to the first body and the second body.

The first arm and the linkage may each be connected to different pivotal connections of the wave energy converter (e.g. as opposed to an end of the linkage and an end of the first arm being connected to the same pivotal connection).

The pivotal connection or connections of the first body may be fixed in position relative to the first body; and/or one or more of the pivotal connection or connections of the second body may be fixed in position relative to the second body.

The linkage may comprise a second arm and a third arm, connected to one another by an additional pivotal connection, the additional pivotal connection being moveable relative to the first and/or second body (and, thus, any pivotal connections that are fixed in position relative to the body or bodies). Only one arm may pivot about the additional pivotal connection. The other arm may not pivot. For example, one arm may be provided with the pivotal connection, about which the other arm pivots.

Translational movement of the additional pivot connection, and/or the second and/or third arm, might be constrained to being in a longitudinal direction, which might assist power extraction. Movement of the additional pivotal connection might be constrained to being along a surface of the first or second body, or a structure mounted thereon. This might be useful if at least a part of a power extraction arrangement is located on the same body.

The property of the converter, configured such that anti-phase surge motion of the first body and second body is realised (in use), may be a horizontal separation between the first body and the second body. The converter may be arranged such that, in use, the horizontal separation between the first body and the second body may be, or may be tuneable to be, substantially between a quarter and three-quarters of a (e.g. prominent or dominant) wavelength in a wave field in which the converter is to be used, or substantially equal to a half-wavelength of a wave in the wave field.

One or more properties of the wave energy converter may be tuneable, to tune the wave energy converter for use in a particular wave field, or may be tuned for use in a particular, pre-determined wave field, such that, in use, the tuning results in: surge resonance of one or both of the first body and the second body, and/or heave resonance of one or both of the first body and the second body, and/or pitch resonance of one or both of the first body and the second body.

The property for resonance may be (depending on the type of resonance required) one or more, or a combination of: a separation between the first body and the second body; and/or a draft, in use, of the first body and/or the second body; and/or a mass of the first body and/or the second body; and/or a dimension of the first body and/or the second body; and/or a structural stiffness of at least a part of the converter; and/or and a centre of buoyancy, gravity and/or a position of a metacentre of that body; a centre of buoyancy of the first body and/or the second body; and/or a centre of gravity of the first body and/or the second body; and/or a position of a metacentre of the first body and/or the second body; and/or a second moment of area of the first body and/or the second body.

The first body may be smaller in size and/or weight than the second body.

The first body and/or second body may have a diameter that is substantially equal to or less than half a wavelength of a wave in the wave field.

According to a third aspect of the invention, there is provided a method of converting energy, the method comprising using the wave energy converter according to the first or second aspect of the invention in the wave field, and generating or extracting power or energy via movement of at least a part of the linkage (e.g. via a power take off arrangement forming part of, or being in connection with, the wave energy converter).

The wavelength of a wave in the wave field may be in the range of 40 m to 300 m, optionally in the range of 40 m to 160 m.

The wave field may comprise swell waves.

According to a fourth aspect of the present invention, there is provided a method of designing a wave energy converter that is configured to float in water, the wave energy converter comprising: a first body, configured to float in water; a second body, configured to float in water; and the first body and the second body being connected to one another via an arm, the arm separating the first body from the second body, substantially in a horizontal direction in use, the arm being pivotally connected to at least one of the first body and second body; the method comprising: designing one or more properties of the wave energy converter such that the wave energy converter is tuned or tuneable for use in a particular wave field, so as to, in use, result in: heave resonance of one or both of the first body and the second body, and/or pitch resonance of one or both of the first body and the second body; and substantially anti-phase motion of the first body and the second body for that wave field. The method may further comprise making a wave energy converter according to the design.

The first body may be additionally connected to the second body by an additional arm. The additional arm may have substantially a same length as the arm. Alternatively, the additional arm may have substantially a different length as the arm (e.g. a longer or shorter length).

The property may be one or more, or a combination of: a separation between the first body and the second body; and/or a draft, in use, of the first body and/or the second body; and/or a mass of the first body and/or the second body; and/or a dimension of the first body and/or the second body; and/or a centre of buoyancy of the first body and/or the second body; and/or a centre of gravity of the first body and/or the second body; and/or a position of a metacentre of the first body and/or the second body; and/or a second moment of area (e.g. the area in plan view) of the first body and/or the second body.

The separation between the first body and the second body may be tuned or tuneable to be substantially between a quarter and three-quarters of a wavelength in the wave field, or substantially equal to a half-wavelength of a wave in the wave field.

The first body may be smaller in size and/or weight than the second body.

In use, the first body may be attached or attachable to another object to restrict movement of the wave energy converter across the wave field.

The first body and/or second body may have a diameter of between 5 m and 100 m. The lower limit may be determined by the smallest practical size for useful energy generation, and/or the upper limit may be less than about half the wavelength of large waves likely to be experienced and otherwise a practical upper limit. Preferably the first body and/or second body may have a diameter of between 20 m and 60 m. The lower limit gives significant energy generation, and/or the upper limit is about half the wavelength of smaller swell waves. The mass of the first and/or second body may be deemed as secondary parameters, the required mass perhaps being dependent on other properties of the wave energy converter (e.g. those required for resonance). However, the first body and/or second body may have a mass of between 40 tonnes and 120,000 tonnes (or higher), preferably between 1000 tonnes and 40,000 tonnes.

The first body and/or second body may have a diameter that is substantially equal to or less than half a wavelength of a wave in the wave field.

The pivotal connection may comprise: a hinge or pivot in connection with the arm, and a secondary arm in connection with the hinge or pivot, the hinge or pivot being connected to the respective first body or second body; and/or wherein the first body and the second body are each pivotally connected to the arm.

The wavelength of a wave in the wave field may be in the range of 40 m to 300 m (as determined for possible wave periods in the range 5 s to 15 s), optionally in the range of 40 m to 160 m (the upper limit being associated with most swell waves).

The wave energy converter may comprise, be provided with, or be used in conjunction with, thrusters for use in aligning or attempting to align the converter with a wave train direction.

The method may further comprise using the wave energy converter in the wave field, the wave field optionally comprising swell waves.

The method may further comprise extracting energy from the wave energy converter using movement of the first body and/or second body about the pivotal connection.

According to a fifth aspect of the present invention, there is provided method of using a wave energy converter that is configured to float in water, the wave energy converter comprising: a first body, configured to float in water; a second body, configured to float in water; and the first body and the second body being connected to one another via an arm, the arm separating the first body from the second body, substantially in a horizontal direction in use, the arm being pivotally connected to at least one of the first body and second body; the method comprising using the wave energy converter in a wave field that results in: heave resonance of one or both of the first body and the second body, and/or pitch resonance of one or both of the first body and the second body; and substantially anti-phase motion of the first body and the second body for that wave field. The method may further comprise making a wave energy converter for such use.

According to a sixth aspect of the present invention, there is provided a wave energy converter, configured to float in water, comprising: a first body, configured to float in water; a second body, configured to float in water; the first body and the second body being connected to one another via an arm, the arm separating the first body from the second body, substantially in a horizontal direction in use, the arm being pivotally connected to at least one of the first body and second body; wherein one or more properties of the wave energy converter are tuneable, to tune the wave energy converter for use in a particular wave field, such that, in use, the tuning results in: heave resonance of one or both of the first body and the second body, and/or pitch resonance of one or both of the first body and the second body; and substantially anti-phase motion of the first body and the second body for that wave field The wave energy converter may be made/designed according to one of the methods described herein.

According to a seventh aspect of the present invention, there is provided a wave energy converter, configured to float in water, comprising: a first body, configured to float in water; a second body, configured to float in water; and the first body and the second body being connected to one another via an arm, the arm separating the first body from the second body, substantially in a horizontal direction in use, the arm being pivotally connected to at least one of the first body and second body; wherein one or more properties of the wave energy converter are tuned for use in a particular, pre-determined wave field, such that, in use, the tuning results in: heave resonance of one or both of the first body and the second body, and/or pitch resonance of one or both of the first body and the second body; and substantially anti-phase motion of the first body and the second body for that wave field The wave energy converter may be made/designed according to one of the methods described herein.

Some aspects have been described in general terms, and without reference to further features that those aspects might include. It should be understood that any one or more of the aspects of the invention may have any one or more features as described in relation to another aspect of the invention, where appropriate and practical, as would be understood by the skilled person.

Figure 2:
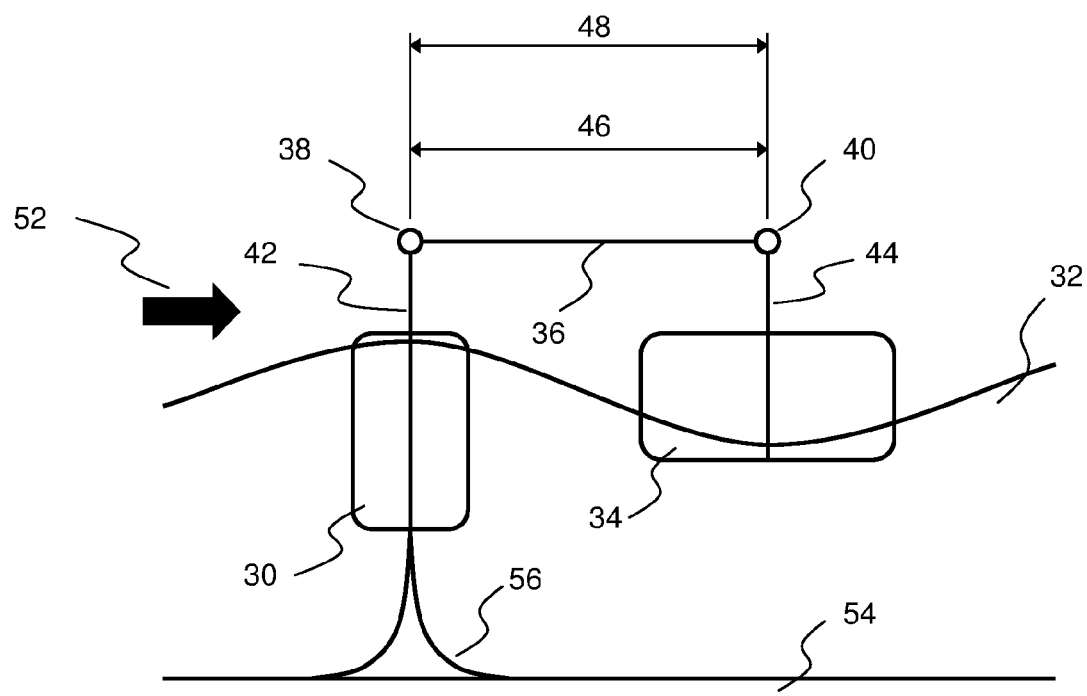
Figure 3:
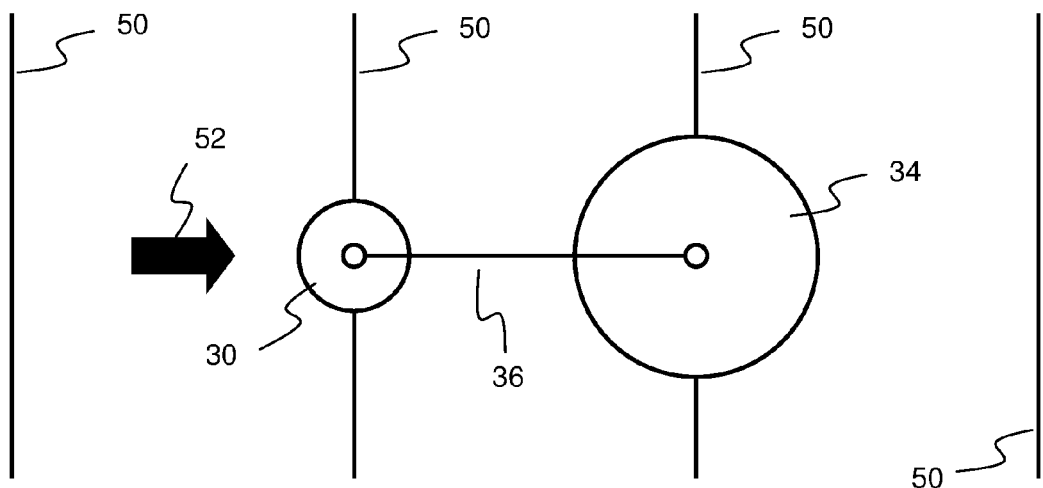
Figure 4:
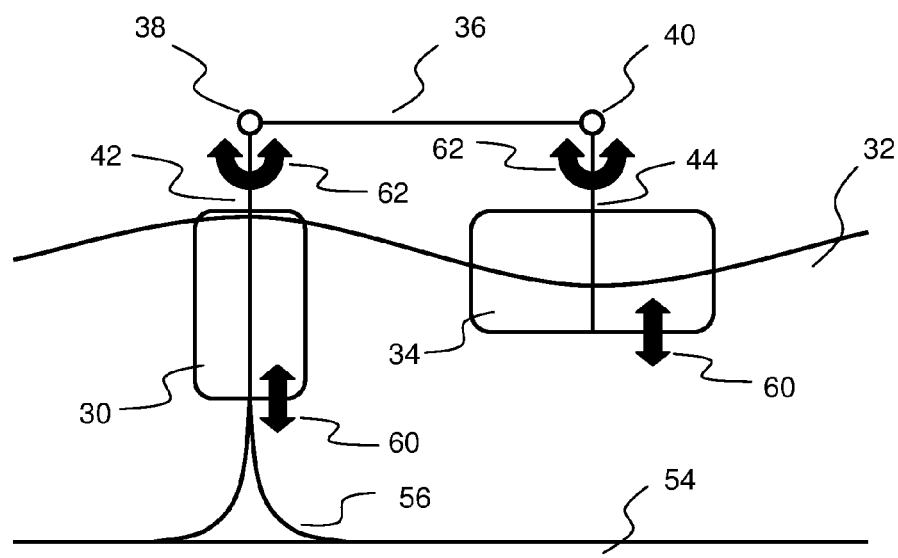
Figure 5:
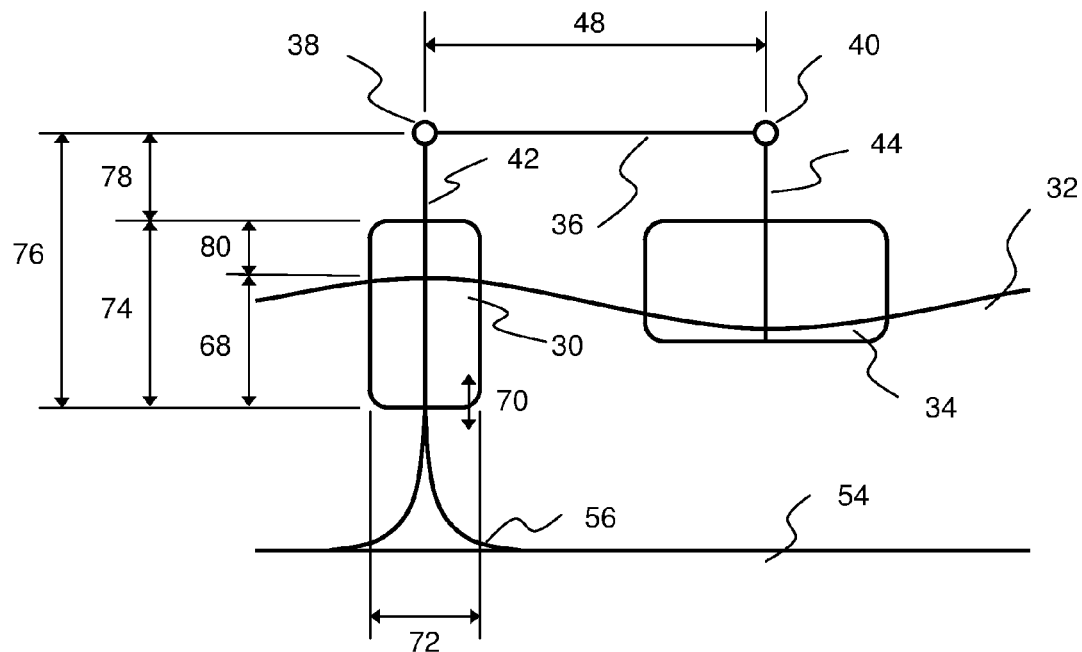
Figure 6:
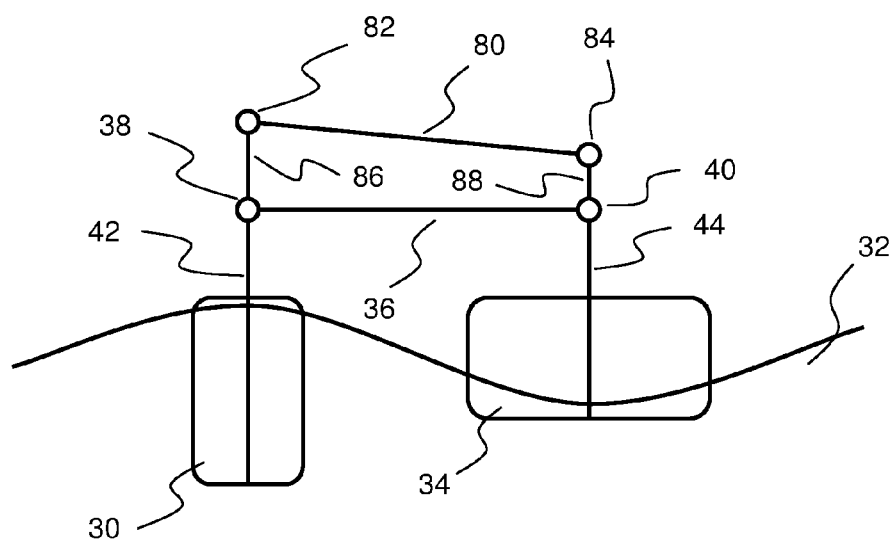
Figure 7:
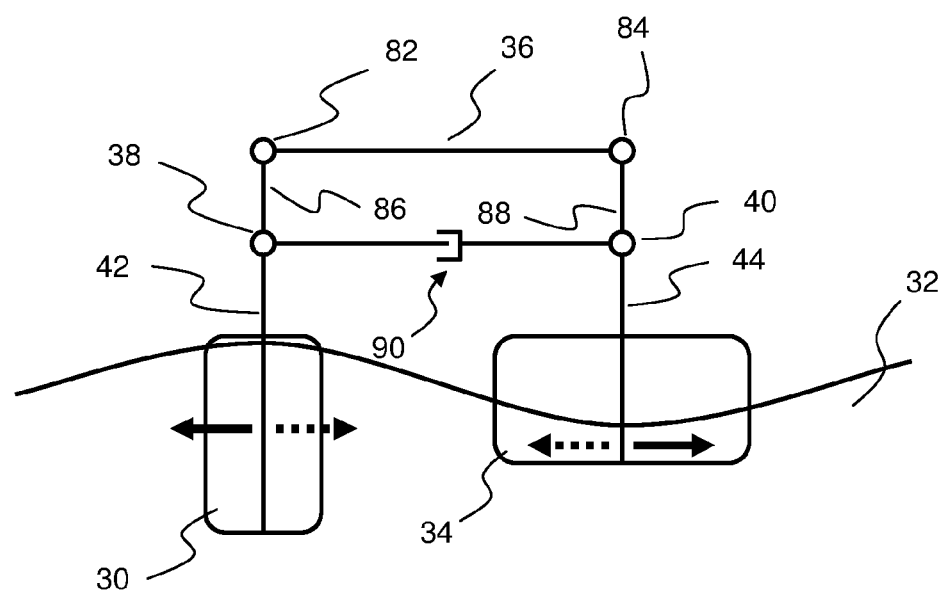
Figure 8:
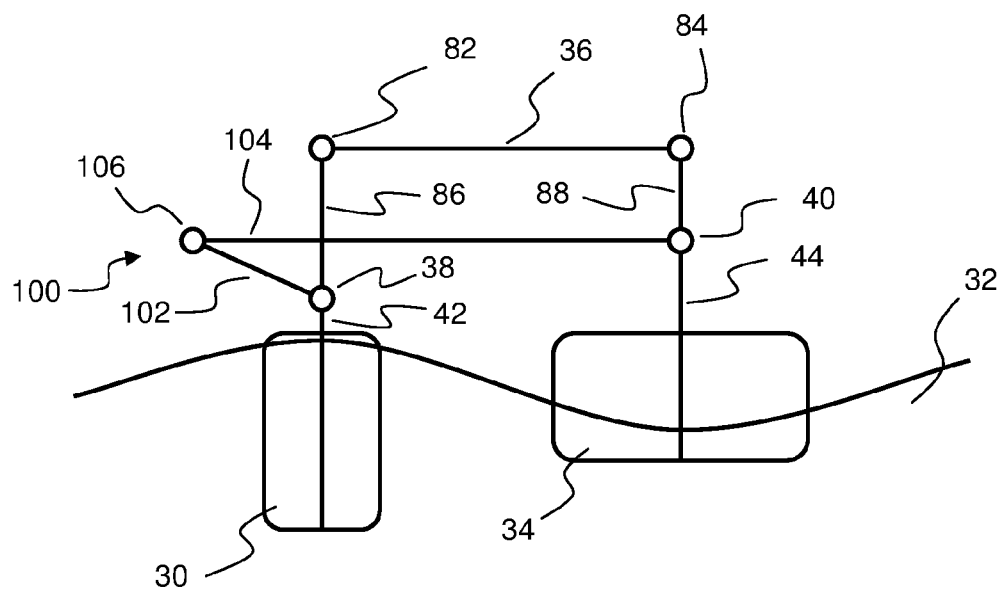
Figure 9:
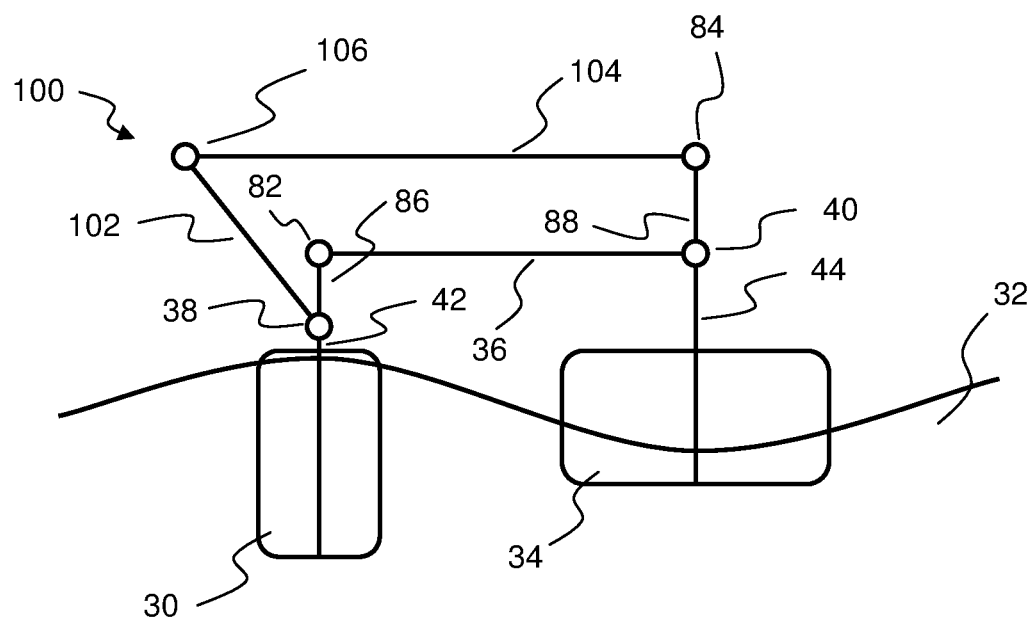
Figure 10:
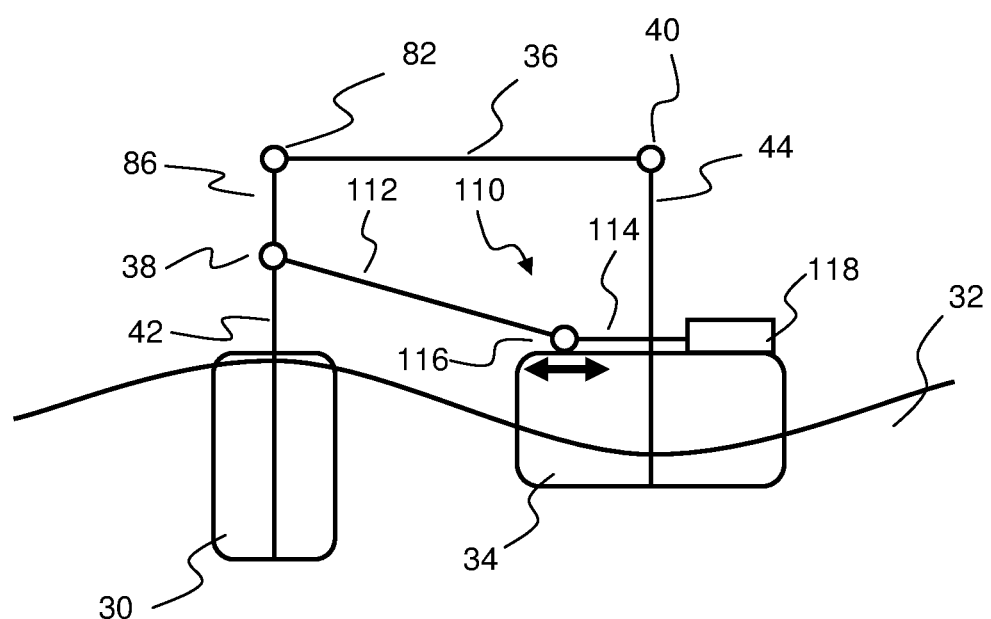
Figure 11:
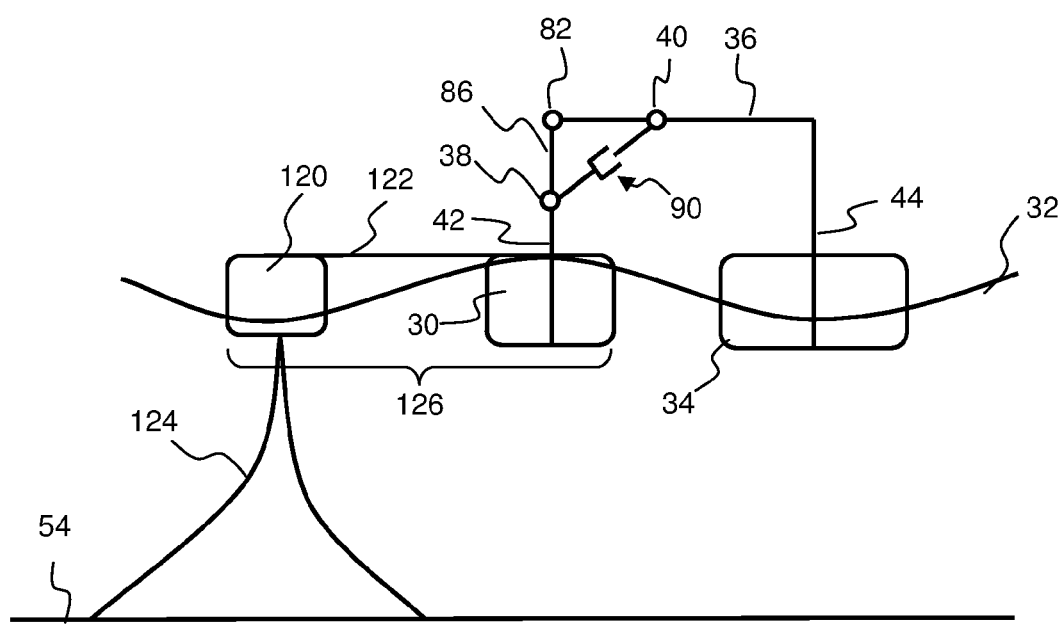

Embodiments of the present invention will now be described, by way of example only, with reference to the accompanying Figures, in which the same features are given the same reference numerals for clarity and consistency. The Figures are now summarised:

FIG. 1 schematically depicts a wave energy converter;

FIG. 2 schematically depicts a wave energy converter according to a first embodiment of the present invention;

FIG. 3 schematically depicts a plan view of the wave energy converter of FIG. 2;

FIG. 4 schematically depicts a wave energy converter according to a second embodiment of the present invention;

FIG. 5 schematically depicts principles associated with the wave energy converter of FIG. 4, and/or the design or tuneability thereof;

FIG. 6 schematically depicts a wave energy converter according to another embodiment of the present invention;

FIG. 7 schematically depicts a wave energy converter according to another embodiment of the present invention;

FIG. 8 schematically depicts a wave energy converter according to another embodiment of the present invention;

FIG. 9 schematically depicts a wave energy converter according to another embodiment of the present invention;

FIG. 10 schematically depicts a wave energy converter according to another embodiment of the present invention; and FIG. 11 schematically depicts a wave energy converter according to another embodiment of the present invention.

FIG. 1 schematically depicts a wave energy converter. The wave energy converter comprises a first body 2 configured to float in water 4. The wave energy converter also comprises a second body 6, also configured to float in water. The first body 2 and the second body 6 are the same size and weight. The first body 2 and the second body 6 are connected to one another via an arm 8. The arm 8 separates the first body 2 from the second body 6, substantially in a horizontal direction in use (i.e., across a surface of water in or on which the wave converter is used). The first body 2 and the second body 6 are each pivotally connected to the arm 8 via secondary arms 10, 12 and respective pivots 14, 16.

In use, the wave energy converter is located on the surface of water 4 that has or constitutes a wave field (which could alternatively or additionally be described as a set of wave conditions). Interaction between the wave field and the wave energy converter causes the first body 2 and the second body 6 to each be subjected to heave motion 18, 20 and pitch motion 22, 24. Both of these types of motion (heave and pitch) cause movement between the secondary arms 10, 12 of the wave energy converter and the arm 8 of the wave energy converter. In other words, the heave and pitch motion causes movement about the pivots 14, 16. Energy from such movement can be converted or extracted at or from these pivots 14, 16.

The wave energy converter of FIG. 1 can be used to convert energy of the waves into another form of energy—for example, by converting or extracting energy at the pivots 14, 16. However, the energy conversion is undertaken in a somewhat arbitrary manner, with no apparent consideration being given to optimising the energy conversion. The present invention is based on such consideration.

At least one aspect of the present invention may be expressed or defined in one of a number of different ways, in isolation or combination. In one instance, an aspect of the present invention may be defined as a method of designing a wave energy converter. The designing may involve designing one or more properties of the wave energy converter such that the wave energy converter is tuned or tuneable for use in a particular wave field, so as to, in use, result in heave resonance of one or both of the first body and the second body, pitch resonance of one or both of the first body and the second body, or substantially anti-phase motion of the first body and the second body for that wave field. The method may optionally comprise making a wave energy converter to that design. In an alternative or additional approach, an aspect of the present invention may be defined as a method of using a wave energy converter. This method comprises using a given (e.g. existing) wave energy converter in a wave field that results in heave resonance of one or both of the first body and the second body, pitch resonance of one or both of the first body and the second body, or substantially anti-phase motion of the first body and the second body for that wave field. An aspect of the invention may alternatively or additionally be defined as a wave energy converter, one or more properties of which are tuneable, to tune the wave energy converter for use in a particular wave field (e.g. so as to, in use, result in heave resonance of one or both of the first body and the second body, pitch resonance of one or both of the first body and the second body, or substantially anti-phase motion of the first body and the second body for that wave field). Finally, as aspect of the invention may alternatively or additionally be defined as a wave energy converter, one or more properties of which having been tuned (i.e., during manufacture, design, installation or the like) for use in the particular, pre-determined wave field (e.g. so as to, in use, result in heave resonance of one or both of the first body and the second body, pitch resonance of one or both of the first body and the second body, or substantially anti-phase motion of the first body and the second body for that wave field).

The present invention is subtle and may in some instances appear to be extremely similar to existing wave energy converters or methods of using such converters. However, the subtlety lies in the designing, using or tuning of a wave energy converter for use in a particular wave field, to optimise the conversion of energy via resonance or anti-phase motion or between the bodies forming the wave energy converter. The subtlety might alternatively lie in the appreciation that, for a given wave field, use of a particular wave energy converter will result in an increase in energy conversion.

Embodiments of the present invention will now be described, with reference to FIGS. 2 to 10.

FIG. 2 schematically depicts a wave energy converter according to an embodiment of the present invention. The wave energy converter comprises a first body 30, configured to float in water 32. The converter also comprises a second body 34, also configured to float in water 32. The first body 30 and second body 34 are connected to one another via an arm 36. The arm separates the first body 30 from the second body 34, substantially in a horizontal direction in use (e.g. across a surface of the water 32). The arm 36 is pivotally connected to each of the first body 30 and the second body 34 by pivots 38, 40 and respective secondary arms 42, 44 that extend from those pivots 38, 40 and into connection with the first body 30 and second body 34, respectively.

In this embodiment, a separation 46 between the first body 30 and the second body 34 is equal to half a wavelength 48 of a wave in the wave field. This ensures that, in use, the heave motions of the first body 30 and the second body 34 are in anti-phase, and to the maximum extent possible in that wave field, thus maximising energy conversion obtainable from heave motion. Although perhaps preferred, the half wavelength separation is not necessarily essential, with useful (i.e. substantially) anti-phase motion being generated when the separation 46 is between a quarter and three-quarters of a wavelength in the wave field.

The relationship between the wavelength in the wave field and the separation 46 between the first body 30 and the second body 34 can be achieved in one of a number of ways, as already alluded to above. For instance, the separation can be achieved by using an existing wave energy converter in a wave field in which the relationship is satisfied (i.e., matching the wave field to the separation between the first and second bodies). In another example, the wavelength of a wave field in which a wave energy converter is to be used or installed will almost certainly be known in advance for reasons of planning permission, expected energy generation, and the like. With this knowledge, the separation between the first and second bodies 30, 34 can be designed to satisfy the above relationship. In a combination of these two approaches, or an alternative to the two approaches, the separation between the first and second bodies 30, 34 could be tuneable, for example by being able to change the length of arm 36, or in any one of a number of different ways (e.g. changing the pivot position along the arm 36).

For clarity, FIG. 3 is used to show the wave energy converter in plan view. Consecutive crests and troughs of waves are indicated by lines 50. The first body 30 and the second body 34 are separated by a distance equal to a distance between a trough and a crest of a wave—i.e., half a wavelength. This relationship may also lead to the establishment or maintenance of standing waves (or at least partially standing waves) created by reflection of waves off one of the first or second body 30, 34 towards one of the other of the first or second body 30, 34. Such standing waves may also lead to optimised or increased energy conversion.

Referring to FIGS. 2 and 3 in combination, additional features of this embodiment (which may also be used in conjunction with later embodiments) are shown.

One such feature is that the first body 30 is smaller in size and/or weight than the second body 34. An advantage of this feature is that the wave energy converter may always self-align with a direction of a wave train 52, which may further optimise energy extraction. Another feature, which may be related to the previously described feature, is that the first body 30 is attachable to another object to restrict movement of the wave energy converter as a whole across the wave field. For instance, the first body 30 may be attached to the sea bed 54 via appropriate tethers, mooring lines or anchors, or the like 56. Alternatively or additionally, the wave energy converter may be attached (which includes tethered or the like) to a floating installation such as an oil rig or a buoy or the like. An additional feature is that the first body 30 and/or the second body 34 has a diameter that is substantially equal to or less than half a wavelength of a wave in the wave field. This has been found to increase movement of the first body 30 and/or second body 34 in the wave field, therefore optimising energy conversion.

The first body and/or second body 30, 34 may have a diameter of between 5 m and 100 m. The lower limit may be determined by the smallest practical size for useful energy generation, and/or the upper limit may be less than about half the wavelength of large waves likely to be experienced and otherwise a practical upper limit. Preferably the first body and/or second body may have a diameter of between 20 m and 60 m. The lower limit gives significant energy generation, and/or the upper limit is about half the wavelength of smaller swell waves. The mass of the first and/or second body 30, 34 may be deemed as secondary parameters, the required mass perhaps being dependent on other properties of the wave energy converter (e.g. those required for resonance, as discussed in more detail below). However, the first body and/or second body may have a mass of between 40 tonnes and 120,000 tonnes (or higher), preferably 1000 tonnes and 40,000 tonnes. Typically, the first body might have a diameter of around 20 m. The mass might exceed 100 tonnes, or 1,000 tonnes. Typically, the first body might have a diameter of around 40 m. The mass might exceed 100 tonnes, or 1,000 tonnes, or 5,000 tonnes.

The first and second bodies might have one of a number of different shapes. Cylindrical shapes might be preferred due to relatively simplicity of construction and installation, and/or due to the curved surface that would be presented to incoming waves (which might promote advantageous diffraction of such waves, or limit dissipation). Other shapes may of course be used, for example bodies having a square, rectangular or other polygonal cross section. Such square, rectangular or polygonal shapes may be easier to construct than cylindrical bodies, and/or have other desirable properties, such as promoting advantageous diffraction and/or reflection of waves. The larger body might generate waves that cause motion of the first body. The first and second bodies may be formed from multiple sub-bodies. One or more additional bodies may be attached to one of the pivots to allow for further energy extraction. The multiple bodies may for form a chain of bodies, or be connected to a central pivot or the like. The bodies need not be custom built. The bodies could be barges or buoys or the like.

To extract energy from waves, the wave energy converter will, of course, need to be located in a wave field. That wave field may preferably comprise swell waves. Swell waves are consistent and predictable in both terms of timing, frequency, magnitude, period and the like. The use of swell waves also allows energy conversion to be optimised, both in terms of being able to design or tune a wave energy converter for a predictable wave field, and also because the wave energy conversion itself will be consistent (since the swell waves themselves are consistent). This avoids or limits the problem of intermittent energy conversion that has long been associated with some forms of wave power, and wind power. Regardless of whether swell waves are used to generate energy, the waves in the wave field will typically have a wavelength in the range of 40 m to 300 m (as determined for possible wave periods in the range 5 s to 15 s), optionally in the range of 40 m to 160 m (the upper limit being associated with most swell waves).

Power take-off from the wave energy converter is not the subject of the present invention. However, and for background information or context, power take off could be undertaken via one or both of the pivots, for example using a rack and pinion arrangement with a clutch and gearbox, or a series of gears and clutches. A flywheel could smooth the power output. Another possibility would be to use motion of the bodies (e.g. via the pivots) in a hydraulic system, for example to drive a pump or pumps with the resulting flow of water or oil driving a turbine, e.g. a Pelton wheel. The present converter is expected to generate high torque and relatively low motion, and this would in turn be suitable for generating fluid flow under very high pressure, well suited to hydraulic systems. At the present time, power take-off via a hydraulic system is thought to be most likely. Power take-off may be achieved during each cycle, or during each half cycle. A preference may depend on the type of mechanism used in the power-take off. Power-take off may be advantageously undertaken during one direction of an oscillation cycle. While the wave energy converter might preferably be used to provide electricity, the converter might additionally or alternatively be used to provide power for desalination or for hydrogen generation.

Promoting or ensuring anti-phase heave motion between the two bodies of the wave energy converter is not the only way of achieving optimum or increased energy conversion.

Resonant motion can also be taken advantage of, as will now be described in relation to FIG. 4.

FIG. 4 schematically depicts another embodiment of the present invention, which may be used independently of or (preferably, to increase energy conversion) in combination with the embodiment of FIGS. 2 and 3. In the wave energy converter of FIG. 4, a separation between the first body 30 and second body 34 has again been designed to be substantially equal to half a wavelength of a wave in the wave field, thus ensuring or encouraging (e.g. maximum) anti-phase motion between the first body and the second body in use. In this embodiment, in addition to the anti-phase motion, resonant motion has been encouraged or ensured, further optimising energy conversion. The subtle but important concept of resonance combined with anti-phase motion has not been realised in wave energy converters of this type (i.e., of this general structure). The resonance may be heave resonance 60 of one or both of the first body 30 or second body 34, or pitch resonance 62 of one or both of the first body 30 or second body 34.

As with the embodiment previously described (in relation to FIGS. 2 and 3), resonance criteria can be established by designing the wave energy converter with prior knowledge of the wave field in which the wave energy converter is to be used. Conversely, resonance can be achieved by using a particular wave energy converter in a wave field that will generate resonant motion of the wave energy converter. As discussed above, the wave energy converter properties can be fixed or, conversely, they may be tuneable to achieve resonance—for example, varying one or more properties of the wave energy converter to achieve resonance. The concept and use of resonance will now be discussed in more detail.

In the following example in which the principles of resonance are demonstrated, resonance is considered for a substantially cylindrical body, the circular surfaces of which are substantially parallel to the surface of the water in which the converter is used (i.e. a longitudinal axis of the converter extends substantially perpendicularly with respect to, and through, the surface of the water).

Heave resonance is where vertical motion causes variable buoyancy balanced by inertia and damping forces. The mass of a body is equal to the displaced mass of water (in stationary conditions). The heave period is defined as:

$$T_h = 2\pi\sqrt{\{d(1+C_a)/g\}}$$

where $T_h$ is heave period, d is body draft, g is gravitational acceleration and $C_a$ is the coefficient of added mass (additional mass of water associated with body motion).

Typical wave periods of swell waves are around 10 s. Therefore, for resonance we would require the heave period $T_h$ to be equal to the period of the swell waves (i.e. $T_h=10$ s). Thus, exemplary values of $T_h=10$ s, $C_a=1$ (which is typical), and $g=9.81$ m/s² gives $d=12.4$ m, which is a practical value.

It is worth noting that heave period $T_h$ is dependent on draft and added mass coefficient, the added mass coefficient being dependent on draft/radius ratio. However, draft is the dominant parameter. Draft d (and thus heave period $T_h$) can be changed/tuned, for example by pumping water in to or out of the body, for example to tune for certain wave fields.

Pitch resonance is dependent on the metacentric height $B \cdot M = I/V$, where B is the position of centre of buoyancy, M is the position of metacentre, I is the second moment of area, and V is displaced volume of water. The metacentric height $B \cdot M$ is the distance between the position of the centre of buoyancy B and the position of the metacentre M. The metacentric height also (and importantly) determines the body stability and it is of course useful for the metacentre to have sufficient height above the centre of gravity G to ensure that the body is stable. For a circular cross-section $I=\pi r^4/4$, and $B \cdot M = r^2/(4d)$. Taking typical values of $r=20$ m (diameter 40 m), and $d=12$ m (calculated above) gives metacentric height $B \cdot M \approx 8$ m, or distance above base of body of approximately 14 m, which is again quite practical.

It is worth noting that metacentric height $B \cdot M$ is dependent on r and d. Draft d (and thus metacentric height $B \cdot M$) can be changed/tuned, for example by pumping water in to or out of the body, for example to tune for or take into account certain wave fields.

Pitch resonance is where rotational motion causes variable buoyancy balanced by inertia and damping forces. Pitch period may be defined as:

$$T_r = 2\pi\sqrt{\{I_G(1+C_r)/(m \cdot g \cdot [M \cdot G])\}}$$

where $I_G$ is the moment of inertia of the body about a horizontal line through its centre of gravity, $C_r$ is coefficient of added mass for pitch, m is mass of body (equal to displaced mass of water), M is position of metacentre and G is centre of gravity. The distance $M \cdot G$ is the distance between the position of the metacentre M and the centre of gravity G. It may be desirable for the pivot point to be close to centre of gravity or at the water level.

Assuming the body cross section approximates a flat disc of mass m, $I_G = m \cdot r^2/4$. We might assume that $C_r=1$ (since this is typical) and $M \cdot G=8$ m (assuming centre of buoyancy coincident with centre of gravity for practical purposes in this example). This gives a pitch period of $T_r \approx 10$ s, which coincides with the wave period of 10 s—resonance is achieved. Note also that this is consistent with the heave period $T_h=10$ s—i.e. pitch and heave resonance may occur at the same time.

From the above equations, it can be shown that the pitch period may also be defined as $$T_r = \pi\sqrt{\{(r^2(1+C_r)/(g \cdot [M \cdot G])\}}$$

and as a result depends on radius r for a given $M \cdot G$.

It will be appreciated that the above equations are given by way of example only, and as an aid to understanding the invention and its implementation. In practice, more detailed calculations/modelling/analysis might be required. Also, the equations have been given for a cylindrical body, whereas a body could of course have a different shape. Such a change in shape might result in modifications to the above equations, and/or a broadening of understanding of the terminology used herein. For example, "diameter" as applied to a body having a square, rectangular or polygonal cross-sectional shape may refer to a maximum or minimal distance across that square or rectangle (or whatever shape the cross-section may be). Despite the above equations being given by way of example only, the above does nevertheless demonstrate that for a wave period of 10 s (typical for swell waves) resonant periods in both heave and pitch may be practically achieved, enhancing energy conversion.

One way of approaching the design and/or tuning of a wave energy converter as described above (or, indeed, below) might be as follows:

1. Heave resonance period may be specified for one or two bodies. Note that this period is dependent mainly on draft, and draft may be tuned by pumping water into or out of a body as ballast for a particular wave field, known say 6-12 hours in advance.

2. Metacentric height should be determined, dependent on draft and radius. This determines stability and pitch natural period.
3. Pitch natural period is otherwise dependent mainly on radius. Radius should thus be set to give pitch natural period corresponding to predominant wave period. This, for example, could well be the predominant swell period. Pitch energy will probably be most significant on a large body.
4. These calculations necessarily give approximate estimates. Values for heave and pitch resonance and metacentric height would be best tested at model scale before full scale deployment.

Of course, it will be appreciated that others ways of approaching the design and/or tuning are possible.

As will be appreciated, resonance may depend on one or more of a number of different properties of the wave energy converter. These properties may be designed for resonance, tuned or tuneable for resonance, or be of a magnitude or the like that coincides with resonant conditions for a particular wave field. FIG. 5 shows the wave energy converter of FIG. 4, but with exemplary indications of properties that may be varied to ensure, encourage or promote resonance (or the anti-phase motion described previously). These properties may coincide with (for example, being the same magnitude, but achieved in a different manner), or be the same as, the properties discussed previously in the examples given for achieving heave and pitch resonance. The properties might be other properties, however, which also (or alternatively) have an effect on resonance (for example, if the bodies were different shapes—e.g. non cylindrical—or the like). For instance, a property may be one or more of, or a combination of, a separation 48 between the first body 30 and the second body 34; and/or a draft 68, in use, of the first body 30 and/or the second body 34; and/or a mass 70 of the first body 30 and/or the second body 34 (the mass or draft being changeable, for example, by pumping water in to or out of the first body 30 or second body 34); and/or a dimension (e.g., diameter 72 or height 74 or shape) of the first body and/or the second body; and/or a centre of buoyancy of the first body 30 and/or the second body 34; and/or a centre of gravity of the first body 30 and/or the second body 34; and/or a position of a metacentre of the first body 30 and/or the second body 34; and/or a second moment of area of the first body 30 and/or of the second body 34. Other properties may, for example, be a distance between a pivot 38 and a base 76 of a body, or between the pivot and the top 78 of a body, or between the top of the body and the waterline 80. The properties described may be interrelated with one another, or may be given different names in different contexts, while still having the same effect/functional property.

It will be appreciated that the heave and pitch motions may be additive effects in generating rotary motion at each or the pivot point due to the nature of progressive waves. Increasing the anti-phase motion, and/or inducing resonance, adds to this additive effect. The use of two bodies that are in connection with one another increases the energy that can be derived from the device in comparison with, for example, a single body device. This is because a greater degree of relative motion can be achieved with two or more bodies than with a single body.

In addition to the anti-phase motion, or resonant motion, discussed above, energy conversion may be increased or optimised by the use of what could be described as lever or stabiliser mechanism. For example, FIG. 6 shows a wave energy converter as shown in and described with reference to any one of FIGS. 2 to 5, but with a lever/stabiliser structure. Referring to FIG. 6, the lever structure comprises an additional arm 80 and pivots 82, 84 located at each end of the additional arm 80, and located in substantially the same vertical plane as the (initially described) arm 36 and pivots 38, 40. The additional arm 80 and pivots 82, 84 extend from the location of the previously described pivots 38, 40 by way of tertiary arms 86, 88. The tertiary arms 86, 88 are a continuous extension of secondary arms 42, 44 (in another embodiment, the tertiary arms may be fixedly attached to the secondary arms), and do not pivot about the pivot points 38, 40. This may provide more effective power extraction, since the movement of the arrangement as a whole (or bodies thereof) may be constrained in such a way to, for example, improve or encourage resonance, for example heave resonance.

The tertiary arms 86, 88 extend in a direction parallel to the direction of extension of the secondary arms 42, 44. In another example (not shown), the tertiary arms 86, 88 can extend in a direction that is not parallel to the direction of extension of the secondary arms 42, 44, e.g. away from the arm 80, or toward the arm 80, which may have an advantageous affect on power take-off, or stability of the arrangement as a whole.

In the example shown in the Figure, the additional arm 80 is longer than the (primary) arm 36, to possibly introduce a lever effect. Such a lever mechanism may be used to increase the motion of one or more of the first body 30 or second body 34, increasing or maximising energy conversion (e.g. and thus power take-off).

In a slight modification to the wave energy converter of FIG. 6, the additional arm need not be greater in length than the primary arm. For example, the additional arm could be the same length as the primary arm.

An additional arm may not be expected to increase or optimise energy conversion. However, and surprisingly, this is not the case—in experiments, an additional arm has indeed been found to increase or optimise energy conversion. In one experiment, for example, the presence of the additional arm resulted in a four times increase in energy conversion. Although the reasons for this are not yet fully understood, one theory is that the additional arm has an effect on the movement of the first and/or second body, for example by imposing movement constraints or the like in one or more directions. This is thought to result in an encouragement and/or an increase in heave and/or pitch resonance, increasing energy conversion and power take-off.

The wave energy converters described so far have already been described as taking advantage of principles such as resonance and/or anti-phase heave motion to extract, or more efficiently extract, energy provided by motion of waves in a wave field. A wave energy converter according to the present invention may, alternatively and/or additionally, take into account surge motion of or within waves of a wave field, as will now be described.

FIG. 7 schematically depicts a modification of the wave energy converter already shown in and described with reference to FIG. 6. The main modification is that while there is still a first rigid arm 36 pivotally connecting the first and second bodies 30, 34, in FIG. 7 there is no second rigid arm directly and pivotally connecting the first and second bodies 30, 34. Instead, in the embodiment of FIG. 7 the first body 30 and second body 34 are (also) connected to one another via a linkage 90 that, via movement of at least a part of that linkage 90, allows (or more readily allows) for movement of the first body 30 and second body 34 toward and away from one another in a surge driven anti-phase manner. That is, translational motion in the horizontal direction is allowed, or more readily allowed.

The conditions required for surge driven anti-phase motion (as schematically depicted by the solid and dashed lines in FIG. 7) are the same conditions as are required for substantially anti-phase heave motion, as previously discussed. That is, in order to be able to take advantage of surge motion in the wave field, the first body 30 and second body 34 are horizontally separated by a distance that is substantially between a quarter and three-quarters of the (preferably prominent or dominant) wavelength of waves in the wave field in which the converter is to be used, or (to maximise the effect of such motion) substantially equal to half a (preferably prominent or dominant) wavelength of a wave in the wave field.

As discussed with the tuning principles mentioned above, the separation may be fixed for a particular wave field or may be changeable (i.e., tuneable) for a particular wave field, or for a particular set of wave conditions. The tuning may be applied in-situ, or before the wave converter is deployed. One or more other properties may be tuned or tuneable to promote or encourage the surge driven anti-phase motion of the bodies 30, 34, for example the one or more properties discussed above in relation to the use of anti-phase heave and/or heave, pitch resonance. However, it is likely that the separation between the bodies 30, 34 will be the most likely determining factor in achieving surge driven anti-phase motion of the bodies 30, 34.

The linkage 90 is a linkage which allows for movement of the first body 30 and second body 34 towards and away from one another (e.g. in a translation manner, with a horizontal component) in a surge driven anti-phase manner, thus allowing for energy to be extracted from such motion. Energy may be extracted, for example, by using a power take off arrangement that is configured to take power off from the converter by movement of at least a part of the linkage, for example using one of the power take off arrangements discussed above. Power take off might be achieved from movement of parts of the linkage toward and/or away from one another, or from a pivot connection of the linkage, or the like. At least a part of the linkage may form a part of, or be, at least a part of the power take-off arrangement.

The linkage may comprise one or more levers, pistons, biasing elements, resilient means (such as flexible arms replacing one or more of the pivots, or sprung pivots, or biasing means between arms or other elements of the structure), or any other structure which allows for the first body 30 and second body 34 to move toward and away from one another to take advantage of the surge motion within the wave field. The linkage 90 may extend in the same vertical plane as the arm 36, which may facilitate more efficient energy extraction. Movement of at least a part of the linkage 90 might also be in the same vertical plane, for much the same reasoning. The movement of the linkage 90 may be longitudinally along a direction of extension of at least a part of the linkage (e.g. in a piston type manner), or in another manner, for example in a hinge-like manner about a pivot in the linkage 90. Preferred implementations of the linkage 90 will be discussed below.

The linkage also allows the first body 30 and the second body 34 to move relative to one another to take advantage motions other than surge motion, such as heave motion and/or roll/pitch motion. Such alternative motions may also cause movement of the linkage which may facilitate energy extraction.

In general, the linkage 90 may be pivotally connected to both the first body 30 and the second body 34, for example by respective pivots 38, 40. This allows part of the linkage 90 to move with the motion of the wave field and the converter as a whole, which allows for, for example, surge motion of the bodies 30, 34 to be converted into motion of at least a part of the linkage 90.

As discussed above, the first arm 36 might preferably be pivotally connected to the first body and second body 30, 34 via pivots 82, 84, although only a single pivotal connection to one body might still result in a workable converter (although this may be less efficient in terms of energy conversion/extraction in certain circumstances—e.g., when certain resonances are to be taken advantage of, or certain types of motion, or the like).

In FIG. 7, the first arm 36 and linkage 90 are connected to different pivotal connections 38, 40, 82, 84 of the wave energy converter. This might allow for a good degree of energy conversion, since motion of the wave energy converter as a whole might be less restricted, while at the same time potentially offering increased stability of the converter as a whole. In another example (not shown), at least one end of the linkage and one end of the first arm might be connected to the same pivot, although this might (converse to the above) be detrimental to the structural integrity and/or stability of the wave energy converter as a whole.

In FIG. 7, it can be seen that (as is the case in relation to the embodiment of FIG. 6), the first and second pivots 38, 82 associated with the first body 30 are fixed in position relative to the first body 30, and that the first and second pivots 40, 84 associated with the second body 34 are fixed in position relative to the second body 34. This might provide good structural integrity and/or stability for the wave energy converter as a whole, from which relatively fixed points arms or linkages or the like can be connected.

The arm 36 or linkage 90 may be connected to and extend between the first pivot 38 associated with the first body 30 and the first pivot 40 associated with the second body 34, and/or from the second pivot 82 associated with the first body 30 to the second pivot 84 associated with the second body 34. This is the arrangement shown in FIG. 7, and is such that the arm 36 and linkage 90 do not cross. This may simplify the design, and/or add to the stability of the converter. In another arrangement (not shown) the arm and linkage may cross in some way. For example, the arm 36 or linkage 90 may be connected to and extend between the first pivot 38 associated with the first body 30 and the second pivot 84 associated with the second body 34, and/or from the second pivot 82 associated with the first body 30 to the first pivot 40 associated with the second body 34.

FIG. 8 shows a wave converter in which a more specific example of the linkage 100 is shown. In this example, the linkage 100 comprises a second arm 102 and a third arm 104 connected by an additional pivot 106. The ends of the second and third arms 102, 104 that are not connected to the additional pivot 106 are connected, respectively, to a pivot of the first body 30 (in this example the first pivot 38) and a pivot of the second body 34 (in this case the first pivot thereof 40).

During anti-phase surge-induced motion of the first body and second body 30, 34, the additional pivot 106 will be caused to move by relative movement of the second arm 102 and third arm 104. Power may be extracted from this movement, for example by connecting a pump or another compressible power extraction means between the second and third arms 102, 104, or by taking power off one of the pivot connections 38, 40, 106 of the linkage 100.

FIG. 9 discloses much the same arrangement as already shown in and described with reference to FIG. 8. However, in FIG. 8 the linkage 100 is above (as opposed to below) the first arm 36.

FIG. 10 shows another arrangement, which may perhaps be described as variation on the embodiments of FIGS. 8 and 9. In the arrangement of FIG. 10, a linkage 110 is again provided. The linkage 110 comprises a second arm 112 and a third arm 114 (which may be, or be described as, a piston—see below) connected together by an additional pivot 116. The end of the second 112 that is not connected to the additional pivot 116 is connected to (in this embodiment) a pivot of the first body 30 (in this example the first pivot 38).

In this example, and distinct from the embodiments of FIGS. 8 and 9, the additional pivot 116 is not relatively free to move in space in accordance with movement of parts of the converter. Instead, translational motion of the additional pivot 116 is constrained to being longitudinal in manner, and along a single, straight axis, as shown by the arrow in the Figure. The constraining may be achieved using one or more guides or rails (not shown) on the second body 34, and/or the constraining may be caused or enforced by the structure of the converter as a whole—e.g. the configuration of the converter may be such that the additional pivot 116 is pushed into and along a surface of the second body 34, no dedicated guides or rails being required. It is noted that the additional pivot 116 is thus connected, in some way (e.g. by being restrained on, or pushed into) to the second body 34.

Movement of the additional pivot 116 as described above will result in corresponding movement of the third arm 114. This might be achieved via the further constraining of the movement of the third arm 114, or via a natural motion of the third arm 114 in light of the restraining of the translation motion of the additional pivot 116. Thus, the third arm 114 might not, in fact, need to be pivotally connected to the additional pivot 116, and only the second arm 112 might need to be pivotally connected to the additional pivot. Longitudinal movement of the third arm 114 may be taken advantage of, for example driving movement of a power take off arrangement 118, or part thereof (hence why the arm could be considered as a piston). The third arm 114 might extend into and/or be, or be considered as, a part of the power take off arrangement 118. Alternatively or additionally, the power take off arrangement 118 might be considered as part of the linkage 110 (this principle applies to any embodiment, not just that shown in FIG. 10). The nature of the power take off arrangement 118 (e.g. its type, location, degree of fixation to the second body 34) might assist in, or facilitate, the longitudinal restraining of the motion of the third arm 114 and/or additional pivot 116. Longitudinal motion of the third arm 114 and/or additional pivot 116 might thus optimise power extraction, or make power extraction easier (there being only direction of motion to accommodate).

One or more of the additional pivot 116, second arm 114 and or power take off arrangement 118 will be attached in some way to the second body 34 (which includes an arm extending there from), to maintain a connection, via the linkage 110, between the first and second bodies 30, 34.

In accordance with the principles shown in and described with reference to FIGS. 7 to 10, surge motion of or within a wave field can be converted (or at least more readily converted) to usable energy by the wave energy converter, while at the same time providing a stable wave energy converter. In previously described (and different) embodiments, resonance has been a principle discussed in relation to extraction of energy from movement of waves in a wave field. Resonance may also be taken advantage of in the surge-based wave energy converters shown in FIGS. 7 to 10, possibly with one or more modifications to the structures thereof. For example, if there is a restoring force present in the structure for returning (or at least urging) the bodies 30, 34 to an equilibrium position, then the structure that provides this force might have a natural frequency. This natural frequency can be taken advantage of to achieve resonance in the wave field. For instance, the structure that provides the restoring force might be a form of biasing means. The biasing means could be one or more springs or the like between arms (or other elements) of the converter, or springs at pivots of the converter (e.g. spring biased pivots). Alternatively, the biasing may be derived from flexing of the arms making up the structure. One or more pivots could be replaced by an arm or bracket or the like, which will provide the biasing when bent, and from which resonance can be achieved or enhanced. Resonance might thus be described as being achievable by taking in to account (e.g. when tuning or building the converter) the structural stiffness of at least a part of the converter, possible relative to and/or for a given wave field.

The surge-based anti-phase motion principles discussed in relation to FIGS. 7 to 10, and also the optional resonance principles associated therewith, may be used independently of the embodiments previously described in relation to earlier Figures, or may be used in combination therewith.

One such feature previously described is that the first body may be smaller in size and/or weight than the second body. An advantage of this feature was described as being that the wave energy converter will naturally self-align with a direction of a wave train, which may further optimise energy extraction. In some instances, there may also be a current, which current may not be in alignment with the wave train and which may thus act on the wave energy converter to move the converter out of alignment with the wave train. This might reduce energy conversion efficiency. To solve this problem, the wave energy converter may comprise, be provided with, or be used in conjunction with, thrusters for use in aligning or attempting to align the converter with the wave train direction. The thrusters may be any convenient type of thrusters, for example using jets, fans, propellers, impellers, turbines or the like to generate a required thrust. The thrusters may be powered with power generated by the converter. The use of thrusters is another feature of the converter which allows the converter to be tuned to the wave field.

The wave energy converters described above have been described as generally comprising two bodies, the relative motion of which allows the converter to take advantage of principles such as resonance and/or anti-phase heave, pitch and surge motion to extract energy provided by motion of waves in a wave field. However, as described above, the first or second body may in fact be formed from multiple sub-bodies. For example, the first body may comprise a further sub-body to which it is connected by some form of mechanical linkage. Additionally, as described above, the wave energy converter may be attached to a floating installation such as an oil rig or a buoy or the like.

FIG. 11 schematically depicts a modification of the wave energy converter already shown in and described with reference to FIG. 7. The primary modification is that in addition to the first and second bodies 30, 34, in FIG. 11 is the wave energy converter additionally comprises a third body 120 which is connected to the first body 30. The third body 120 may be considered to be a sub-body of the first body 30. The third body 120 may be a buoy. The third body 120 is connected to the first body 30 by a rigid mechanical linkage 122.

The third body 120 is attachable to another object to restrict movement of the wave energy converter as a whole across the wave field. For instance, the third body 120 may be attached to the sea bed 54 via appropriate tethers, mooring lines and/or anchors, or the like 124. Alternatively or additionally, the wave energy converter may be attached (which includes tethered or the like) to a floating installation such as an oil rig or a buoy or the like.

A further modification to the energy converter already shown in FIG. 7 is in the arrangement of the connections between the first body 30 and the second body 34. In particular, similarly to the wave energy converter shown in FIG. 7, in FIG. 11 the first arm 36 is connected through the pivotal connection 82 to the secondary arm 42 that extends from the pivot 82 and into connection with the first body 30. The first arm 36 is further connected to the secondary arm 44 that extends from the connection with the first arm 36 and into connection with the second body 34. However in the embodiment shown in FIG. 11 connection between the first arm 36 and the secondary arm 44 is rigid. Therefore the first body 30 and the second body 34 are now connected through a single pivot 82. This may simplify the design, and/or add to the stability of the converter.

Additionally, the linkage 90 which allows for movement of the first body 30 and the second body 34 toward and away from one another in a surge driven anti-phase manner superimposed on motion due to heave and/or pitch is connected in a different manner from that shown in FIG. 7. The linkage 90 is connected to the secondary arm 42 at pivotal connection 38. The linkage 90 is also connected to the first arm 36 at pivotal connection 40. This allows part of the linkage 90 to move with the motion of the wave field and the converter as a whole, which allows for, for example, surge motion of the bodies 30, 34 to be converted into motion of at least a part of the linkage 90. It should be noted that first arm 36 and secondary arm 42 do not pivot at pivotal connections 40 and 38 respectively, but are instead continuous and rigid along their lengths.

As discussed above, the first and second bodies 30, 34 should have a diameter which is less than about half the wavelength of large waves likely to be experienced, and greater than the smallest practical size for useful energy generation. In particular, the first body and/or second body 30, 34 may have a diameter of between 5 m and 100 m. In the embodiment illustrated in FIG. 11 it may be advantageous for the first body 30 to have a diameter of around 30 m and a draft of around 12 m. The second body may have a diameter of around 40 m and a draft of around 19 m. The mass of the first and/or second body 30, 34 may be deemed as secondary parameters, the required mass perhaps being dependent on other properties of the wave energy converter (e.g. those required for resonance, as discussed in more detail above).

The third body 120 should be small enough so as to not diffract waves from the first and second bodies 30, 34. The third body 120 may have a diameter of between 5 m and 40 m. Preferably, the third body may have a diameter of around 10 m.

The third body 120 should have sufficient buoyancy so as to support mooring cables. Such mooring cables will have a damping effect on the motion of the third body 120. The third body 120 may have an added mass which is selected so as to provide significant inertia. For example, a third body 120 having a high effective mass will generate inertia to oppose the moment created by the first body 30, to which the third body is rigidly connected by linkage 122. The third body 120 may have a draft of around 3 m.

In this embodiment, as with other embodiments, the separation between the first body 30 and the second body 34 is substantially equal to half a wavelength of a wave in the wave field. This ensures that, in use, the heave motions of the first body 30 and the second body 34 are in anti-phase. Additionally, the separation between the first body 30 and the third body 120 is substantially equal to half a wavelength of a wave in the wave field. This also ensures that the heave motions of the first body 30 and the third body 120 are in anti-phase. The separation of the first and second bodies 30, 34, and the first and third bodies 30, 120 may be around 60 m, in a typical application having a wavelength of 120 m. However, although perhaps preferred, the half wavelength separation is not necessarily essential, with useful (i.e. substantially) anti-phase motion being generated when the separation is between a quarter and three-quarters of a wavelength in the wave field.

Experimental observations of a wave energy converter in accordance with FIG. 11 show that the larger first and second bodies 30, 34 can oscillate in anti-phase heave motion. The larger of the two bodies, the second body 34, may have dominant motion, which may be resonant heave motion.

Additionally, the first body 34 (including the third body 120 to which it is rigidly connected) can oscillate in surge motion. The surge motion of the first body 30 can occur relatively independently of the second body 34, with the first and second bodies moving relative to each other about the pivotal connection 82. The surge-based anti-phase motion principles discussed in relation to FIGS. 7 to 10, and also the optional resonance principles associated therewith, may be used in combination with the wave energy converter shown and described with reference to FIG. 11.

As described above, the first and third bodies 30, 120 will move in anti-phase, as a result of their half-wavelength separation. However, the first and third bodies 30, 120 are also connected by a rigid linkage 122, forming a combined rigid body 126. Therefore, the combined rigid body 126 comprising the first and third bodies 30, 120 will pitch as a single body driven by the respective heave motion of the first body 30 and the third bodies 120. The combined rigid body 126 may also move with pitch motion, being forced by the pitch movement of the first body 30, owing to the larger diameter and draft of the first body 30 than the third body 120.

During anti-phase surge-induced motion of the first body and second body 30, 34, the pivot 82 will be caused to move by relative movement of the first arm 36 and secondary arm 42. Power may be extracted from this movement, for example by connecting a pump or another compressible power extraction means between the first and secondary 36, 42, or by taking power off one of the pivot connections 38, 40 of the linkage 90.

Mathematical modelling of the wave energy converter comprising multiple sub-bodies within the first and/or second bodies 30, 34 show that heave, pitch and surge motions, as described above, can superimpose positively. In this way, power generation can be enhanced by the inclusion of multiple sub-bodies within the first and/or second bodies 30, 34. It should be noted that pitch motion here is referred to as that of the first and second bodies 30, 34, rather than the combined rigid body 126, as forced by heave motion of the respective first and third bodies 30, 120. The three distinct modes of motion can all work together, to cause greater power to be generated and extracted by the wave energy converter.

Experimental observations indicate that a wave energy converter having first and second bodies 30, 34, the first body further comprising a sub-body (rigidly connected third body 120), can generate significantly more power than a two body system not having the rigidly attached sub-body. In particular, a system having two bodies and a sub-body has been shown to generate approximately three times as much power as a simple two-body system.

It is considered likely that the increase in power generated by the system incorporating the additional sub-body which is in some way anchored or tethered to a fixed point (such as the sea bed 54) results from the partial isolation of motion of the first body 30. In an un-tethered two body system in which the two bodies are connected by some form of damped linkage (which incorporates the power take off), the first and second bodies generally develop some form of combined motion. For example, the two bodies may pitch together, reducing the relative motion between the two bodies, and consequently reducing the extension and contraction of the damped linkage, which is responsible for the power take off. The two body system may in some way act as a single body. However, the provision of an additional (sub-)body in the system reduces the tendency of the system to adopt single body motion, and instead enhances the relative motion between the first and second bodies.

A further advantage of the use of a wave energy converter comprising first and second bodies 30, 34 and a sub-body (third body 120), may be found in considering the capture width of the wave energy converter. The capture width of a wave energy converter is the width of the wave crest which transmits power to the converter. For a single body heaving in ideal resonant conditions the capture width is $L/(2\cdot\pi)$, where L is the wavelength of the wave field. Alternatively, for a single surging or pitching body, the ideal resonant capture width is increased to $L/\pi$. The theoretical maximum capture width for a body capturing energy from all three modes in combination is close to 0.8 L. A system incorporating a first and second body and the sub-body (third body) enables the three modes to be activated giving a potential maximum capture width of about 0.8 L. This provides a factor of about 2.5 increase over the surging and pitching body, or a factor of about five increase over the heaving body system. In this way, the system having a first and second body and a sub-body (third body) can access a greater area of a wave field, and consequently extract more energy by effectively using multiple modes of operation simultaneously. In practice a capture width of about L/2 may be expected. The addition of a third body not only acts to moor the wave energy converter, but also to control the mode of operation of the wave energy converter. By controlling the mode of operation of the wave energy converter, the third body allows the cooperation of the multiple modes of operation, allowing the modes to superimpose, and the energy extracted to be increased accordingly.

A further advantage which is associated with using a system which is attached to a floating installation such as an oil rig or a buoy or the like is that the systems is generally more directionally stable than a system with no such attachment. For example, the three body system tends to align with the direction of wave propagation, allowing effective extraction of wave energy.

The use of an additional third body 120 may be used in conjunction with any of the wave converter linkage arrangements shown in and described with reference to FIGS. 7 to 10.

Alternatively or additionally, an additional third body 120 may be used in conjunction with any of the wave energy converters shown in and described with reference to FIGS. 2 to 6.

Secondary or tertiary arms have been described above as being used to connect the pivots to the first or second body. Arms are one example of any supporting structure that may be used to attach the pivots to the respective body, or, more generally, to fix the position of the pivot relative to the respective body. In another example, the pivot may be attached directly to, or form a part of, the body itself.

The term 'pivot' has been used herein as describing a structure which facilitates a pivoting motion. Thus, it will be understood that the term 'pivot' may be used interchangeably with the term 'pivotal connection', or any other term which describes a structure that allows for such motion.

Pitch resonance has been discussed above, although this could be described alternatively or additionally as roll resonance. For instance, for cylindrical bodies pitch and roll are equivalent. For bodies of a different shape, roll and pitch resonance may be different, and separately attainable (either in isolation or in combination).

Specific wavelengths of waves in a wave field have been described above. It will be appreciated that there may be more than one wavelength in a given wave field. When the wave energy converter is described as being tuned or tuneable to a particular wavelength, the wavelength may be more particularly or more practically described as a prominent or dominant wavelength in or of the wave field, for example a prominent or dominant swell wavelength. Being tuned or tuneable to a prominent or dominant wavelength might optimise energy conversion/extraction.

The different embodiments and/or or principles described above may, when and where appropriate, be used in isolation or in combination with one another. For instance, the antiphase heave or surge relationship discussed above might preferably used in combination with the resonance criteria discussed above to maximise power take-off. In a single implementation of a wave energy converter, one body may be subjected to resonance (e.g. one or more of heave, pitch, and surge), when at the same time another body of the converter may not (e.g. simply one or more of heave, pitch, and surge movement). For instance, one body may be tuned for one or more types of resonance (e.g. one or more of heave, pitch, and surge), and the other body for a possibly different type of resonance (e.g. one or more of heave, pitch, and surge), or no resonance. Other features of the invention, for example the attaching of the first body to another object, or the first body being smaller than the second object, may also be used in combination with one, more or all of the embodiments described above. In general, it should be appreciated that the embodiments described above have been given by way of example only. Various modifications may be made to the described embodiments, and also to embodiments not described herein, without departing from the scope of the invention, which is defined by the claims that follow.

The invention claimed is:

1. A wave energy converter, configured to float in water, comprising:
a first body assembly, comprising a first body, configured to float in water and a sub-body rigidly connected to the first body by an assembly arm, the sub-body being configured to float in water;

a second body, configured to float in water; and tethers, mooring lines, and/or anchors directly attached to the sub-body to restrict movement of the wave energy converter as a whole; wherein:

the first body is smaller in diameter and/or weight than the second body; and the sub-body is smaller in diameter and/or weight than the first body; and the first body assembly and the second body being connected to one another via a first arm, the first arm being pivotally connected to at least one of the first body assembly and second body;

the first body assembly and the second body also being connected to one another via a linkage that, via movement of at least a part of that linkage, allows for movement of the first body assembly and second body toward and away from one another in a surge driven anti-phase manner;

one or more properties of the wave energy converter provides for tunability in a particular wave field such that the tuning results in anti-phase motion of the first body assembly and the second body relative to one another for that wave field.

2. The wave energy converter of claim 1, wherein the one or more properties of the wave energy converter comprises a horizontal separation between the first body assembly and the second body, and the converter is arranged such that the horizontal separation between the first body assembly and the second body is tuneable to be between a quarter and three-quarters of a wavelength in a wave field.

3. The wave energy converter of claim 1, wherein the one or more properties of the wave energy converter comprises a horizontal separation between the first body and the sub-body, and the converter is arranged such that the horizontal separation between the first body and the sub-body is tuneable to be between a quarter and three-quarters of a wavelength in a wave field.

4. The wave energy converter of claim 1, wherein the linkage is pivotally connected to the first body and the second body.

5. The wave energy converter of claim 1, wherein the first arm is pivotally connected to the first body and the second body.

6. The wave energy converter of claim 1, wherein the first arm and the linkage are each connected to different pivotal connections of the wave energy converter.

7. The wave energy converter of claim 1, wherein the first arm being pivotally connected comprises the first arm being fixed in position relative to the first body and/or fixed in position relative to the second body.

8. The wave energy converter of claim 1, wherein the one or more properties of the wave energy converter provides for tunability in a particular wave field, such that the tuning results in: surge motion of the first body assembly and the second body toward and away from one another, and/or surge resonance of one or both of the first body assembly and the second body, and/or heave resonance of one or both of the first body assembly and the second body, and/or pitch resonance of one or both of the first body assembly and the second body.

9. The wave energy converter of claim 1, wherein the one or more properties is one or more, or a combination of:

a separation between the first body assembly and the second body; and/or a separation between the first body and the sub-body; and/or a draft of the first body and/or the second body and/or the sub-body; and/or a mass of the first body and/or the second body and/or the sub-body; and/or a dimension of the first body and/or the second body and/or the sub-body; and/or a structural stiffness of at least a part of the converter; and/or a centre of buoyancy of the first body and/or the second body and/or the sub-body; and/or a centre of gravity of the first body and/or the second body and/or the sub-body; and/or a position of a metacentre of the first body and/or the second body and/or the sub-body; and/or a second moment of area of the first body and/or the second body and/or the sub-body.

10. The wave energy converter of claim 1, wherein the first body and/or second body and/or sub-body has a diameter that is equal to or less than half a wavelength of a wave in the wave field.

11. The wave energy converter of claim 1, wherein the wavelength of a wave in the wave field is in the range of at least one of 40 m to 300 m and 40 m to 160 m.

12. The wave energy converter of claim 1, wherein the wave field comprises swell waves.

13. The wave energy converter of claim 1, wherein the linkage comprises a second arm and a third arm connected to one another by an additional pivotal connection, the additional pivotal connection being moveable relative to the first and/or second body.

14. The wave energy converter of claim 13, wherein translational movement of the additional pivotal connection, and/or the second and/or third arm, is constrained in a longitudinal direction.

15. A method of converting energy, the method comprising using the wave energy converter of claim 1 in the wave field, and generating power via movement of at least a part of the linkage.

16. The method of claim 15, wherein the wavelength of a wave in the wave field is in the range of at least one of 40 m to 300 m and 40 m to 160 m.

17. The method of claim 15, wherein the wave field comprises swell waves.

* * * * *